Oct. 15, 1974   L. I. GRINDSTAFF ET AL   3,842,165
MANUFACTURE OF GRAPHITE BODIES FROM HIGH SULFUR COKE
Filed Feb. 26, 1973   11 Sheets-Sheet 10

INVENTORS:
LLOYD I. GRINDSTAFF
MACK P. WHITTAKER

BY: *Donald I. Cassady*

United States Patent Office 3,842,165
Patented Oct. 15, 1974

3,842,165
MANUFACTURE OF GRAPHITE BODIES FROM HIGH SULFUR COKE
Lloyd I. Grindstaff, Elizabethton, Tenn., and Mack P. Whittaker, Stamford, Conn., assignors to Great Lakes Carbon Corporation, New York, N.Y.
Continuation-in-part of abandoned application Ser. No. 135,726, Apr. 20, 1971. This application Feb. 26, 1973, Ser. No. 335,996
Int. Cl. C01b 31/04
U.S. Cl. 423—448
10 Claims

ABSTRACT OF THE DISCLOSURE

Sound graphite bodies can be prepared from early puffing needle high sulfur cokes by admixing in amounts up to about 67 percent of such cokes with a controllable, regular puffing needle coke and an effective amount of a conventional puffing inhibitor without further modification of the normal graphitization technique.

RELATION TO OTHER PREVIOUSLY FILED APPLICATION

Figure 1:
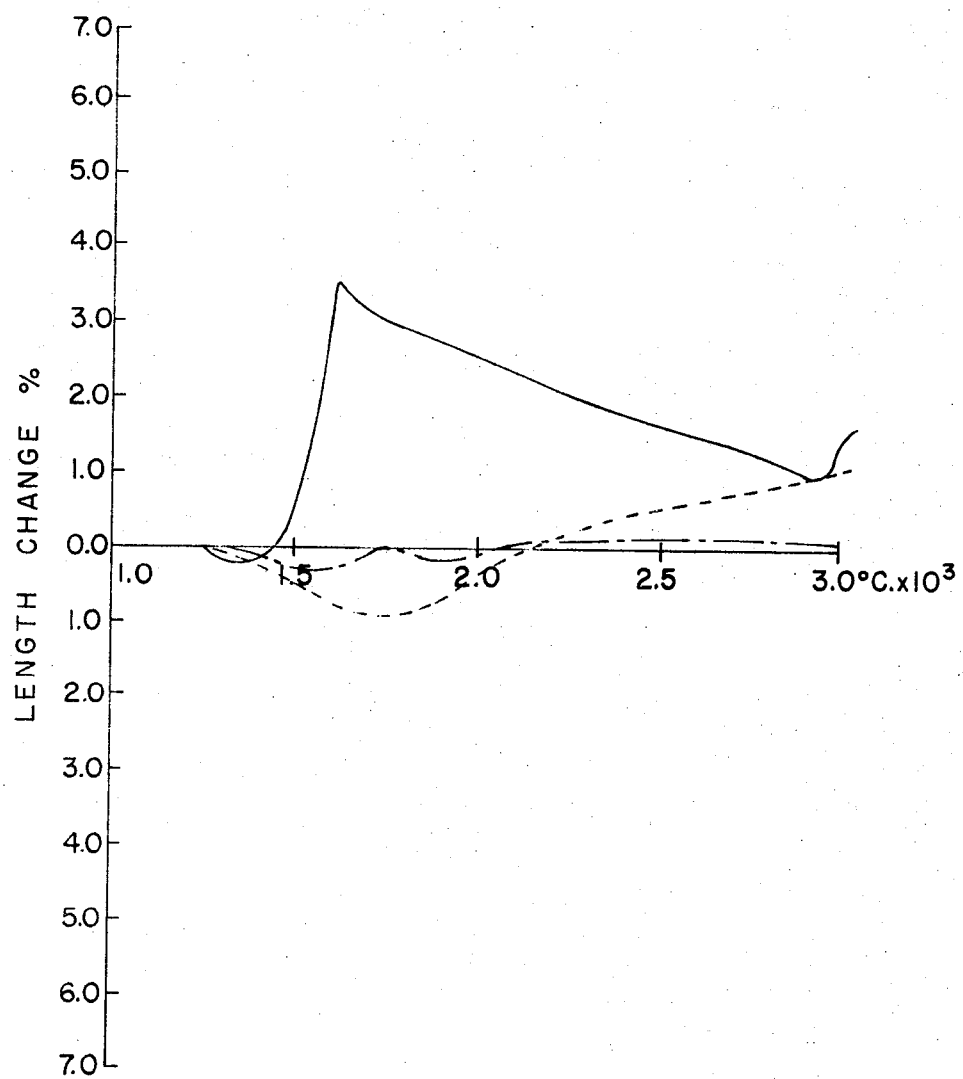

This application is a continuation-in-part of co-pending application Ser. No. 135,726, filed Apr. 20, 1971 now abandoned.

BACKGROUND OF THE INVENTION

Graphite is a material which is a good conductor of heat and electricity, resistant to high temperatures, and also highly resistant to attack by most chemical reagents. Accordingly, graphite is an extremely important and useful material in industry in a great variety of applications.

Almost all the artificial graphite which is made today is prepared according to the teaching first set forth by E. G. Acheson in 1896. Acheson's process, which was the first successful process for the commercial production of artificial graphite articles, has been somewhat modified since that time. As a general rule, artificial graphite articles are fabricated from calcined petroleum coke base material. According to the process, a derivative of coal and petroleum is first coked and the coke product is calcined, milled, and screened to the proper particle size fraction. The milled coke is mixed with coal tar pitch and molded or extruded into the desired shaped article by the application of heat and pressure. Alternatively, a small portion of anthracite coal is added to the coke-pitch mixture prior to molding. The resultant shaped articles are baked to about 1000° C. and subsequently graphitized at 2500° C. to 3000° C. in an electric furnace.

One of the most serious difficulties encountered in this process is the undesirable sudden, irreversible expansion (commonly referred to as "puffing") and even cracking of the shaped masses caused by the escape of sulfur during the heat treatments of the graphitizable mixtures.

Graphitization of coke bodies derived from a carbonized pure organic compound, as for example acenaphthylene, will be accompanied by a shrinkage of the material as volatiles are evolved during the heat-up. This shrinkage can amount to a change of about 3 percent in the length of a molded piece of pure organic coke perpendicular to the aligment at 3000° C., and comparable shrinkages in other directions. Concurrent to this shrinkage is the natural tendency for a piece of carbon or graphite to expand during heat-up. The coefficient of thermal expansion of the same piece of coke would be of the order of 1 percent to 3000° C. The overall effect would show an indicated shrinkage of about 2 percent at 3000° C.

During the course of graphitization of a mixture of calcined coke and a pitch binder the presence of sulfur in the coke and/or binder causes an irreversible expansion to occur as the temperature increases. A sulfur-free coke would be expected to shrink of the order of about 2 percent of its baked length during graphitization to 3000° C. as hereinbefore discussed. The presence of sulfur in an amount which causes no appreciable change in length during this processing can be tolerated. However, any expansion (puffing) during graphitization causes cracks and faults to occur in the graphite structure. These cracks and faults are detrimental to the final product since they contribute to the failure of the graphite body during use.

Coke materials from various commercial sources exhibit varying puffing characteristics. Some petroleum cokes, as for example a Great Northern refinery coke, will puff at about 1600° C. exhibiting an increase in length of about 2.5 percent of its molded length perpendicular to the direction of alignment and an American Oil Company El Dorado coke puffs at about 1600° C., as for example Conoco's premium or needle coke, will expand more slowly, achieving a maximum size, at about 2800° C., of about 1.5 percent elongation.

For this reason graphite bodies manufactured from low-sulfur cokes and feedstocks are preferred. However, such low-sulfur supplies are diminishing due to the exhaustion of satisfactory petroleum sources. Therefore, it has become necessary to explore means to make satisfactory graphite bodies from coke produced from higher sulfur crude oil and coke feedstocks.

Puffing which occurs at or above 2000° C. can generally be controlled. One method that has been devised to circumvent this expansion or puffing phenomenon is to add an effective amount (i.e. up to 10 percent by weight) of an iron or calcium compound, preferably 0.5 to 5 percent of an oxide, to the graphitizable mixtures. The effect of these additives is to retard the puffing that would normally occur between about 1800 and 2500° C. with most petroleum cokes, so that it does not occur before a temperature of 2800° C. is reached.

The conventional puffing inhibitors, usually oxides of iron, calcium, aluminum, and manganese, do not materially affect the early puffing cokes, however. In some cases, up to 14 percent iron oxide has been unable to prevent the unacceptable expansion of an early puffing coke from graphitization.

OBJECTS OF THE INVENTION

It is an object of the present invention to provide a method for the manufacture of high quality graphite bodies from cokes which previously could not have been used.

It is a further object of this invention to provide a method for the manufacture of high quality graphite bodies from coke-pitch mixtures comprising early puffing cokes.

It is a further object of this invention to provide a method for the preparation of coke blends wherein puffing characteristics can be controlled by the use of conventional puffing inhibitors.

SUMMARY OF THE INVENTION

In fulfillment of these objects this invention provides for the manufacture of a graphite body from a blend consisting of up to about 67 percent of a coke which puffs at below 2000° C., at least enough of a conventional puffing inhibitor to prevent puffing, and the remainder of a controllable, regular puffing needle coke. The coke blend is combined with a pitch binder and graphitized in the usual manner to provide a sound graphite body. By this method cokes which contain sulfur which leaves at an early stage of graphitization can be utilized in the manufacture of acceptable graphite electrodes by conventional procedures.

DETAILED DESCRIPTION OF THE INVENTION

By the word "coke" as used in this invention is meant a "needle coke" of the type described in Shea, U.S. 2,775,549 and 2,922,755 which exhibit irreversible expansion during graphitization. Early puffing "cokes" are those cokes which puff at below about 2000° C. and regular puffing cokes or regular puffing needle cokes are those which puff at above about 2000° C.

Prior to carrying out the method of this invention, cokes are graded to determine the characteristic of the coke upon heating to 3000° C. under conventional graphitization techniques. Needle cokes are conventionally used to prepare synthetic graphite. Certain needle cokes will irreversibly expand (puff) at about 2000° C. Where this puffing is of a great magnitude, leading to cracked and/ or bloated graphite bodies, adding 0.2 to about 10 percent of a conventional puffing inhibitor will normally delay the puffing and lower the amount of expansion to a tolerable range. Typically these cokes contain less than about 1.4 to 1.5 weight percent sulfur.

Other needle cokes will expand uncontrollably at below 2000° C. Examples of such cokes are those containing over about 1.4 to about 1.5 percent sulfur in the coke body. Such cokes are obtained from either/or both catalytic and thermal cracking operations at refineries which include the American Oil Company at El Dorado, Arkansas and Sugar Creek, Missouri; Farmers Union at Laurel, Montana; Humble Oil and Refining Company at Billings, Montana; Signal Oil and Gas Company at Houston, Texas; and Sinclair Oil and Refining Company at Houston, Texas, among others. The expansion of these cokes cannot be controlled by the conventional puffing inhibitors. The cokes have heretofore been unacceptable for use in the formation of dimensionally stable graphite bodies.

In the practice of this invention, up to about 67 percent of an early puffing needle coke, preferably about 5 to about 50 percent of this coke can be admixed with a regular puffing coke. In addition, at least enough of a conventional puffing inhibitor to prevent puffing of the coke mix upon heating to 3000° C. must be added. Typically, from about 0.2 to about 10 percent of the inhibitor must be added.

By conventional puffing inhibitor as used in this description is meant a compound of iron, aluminum, manganese, or calcium. Of particular use are the oxygen containing compounds of the above elements as for example the oxides, hydroxides, and carbonates.

During the course of heating a carbon artifact to 3000° C. several competing effects govern the size of the piece. Of particular note are the coefficient of expansion, the increase in size of the piece with an increase in temperature, due primarily to an increase in kinetic energy within the molecular structure, and the shrinkage of the piece due to vaporization of the non-carbon atoms contained therein and the subsequent rearrangement phenomenon can be illustrated by the graphitization of acenaphthylene coke which shrinks about 2 linear percent from 1000° C. to 3000° C.

The extent of puffing exhibited by the carbon body as a function of temperature during heat treatment is measured with a dilatometer, constructed from graphite tubes housing a push rod in contact with a sensitive dial indicator. The expansion is measured in the direction parallel to the molding direction or perpendicular to the extrusion direction, that is, perpendicular to the particle alignment imposed through the fabrication operation. The dilatometer containing the carbon body is heated in a graphite tube furnace to about 2900° C. at a rate of about 14° C. per minute. An inert atmosphere of nitrogen or argon is maintained throughout the heating cycle. The increase or decrease in size of the piece is measured at regular intervals during the heating cycle and converted to percent change of the original.

The drawings which comprise a portion of this application and are to be read in conjunction therewith are grapical representations of the effect of the use of the method of this invention on the change in length with increasing temperature of carbon bodies made thereby.

In each figure are presented one curve, a solid line, showing the puffing characteristic of a typical early puffing coke; a second curve, an evenly dotted line, showing the puffing characteristic of a regular puffing coke; and a third curve, an uneven dashed line, showing the actual puffing characteristic of the blend.

The first 8 drawings are to be read as pairs. The first two figures are related to the same cokes, being Great Northern coke, a marginally controllable early puffing coke obtained from Pine Bend, Minnesota; and Continental Oil Company (Conoco) premium coke obtained by coking of a high boiling residue from a thermal cracking unit at Ponca City, Oklahoma, operated to obtain gas, gasoline, and gas-oil from crude petroleum fractions, as in Example IX of U.S. 2,775,549.

FIG. 1 shows the puffing characteristics of substituting one-third of the Conoco premium coke with the early puffing Great Northern coke but without the use of a conventional puffing inhibitor. It can be seen that the actual effect of mixing on the puffing of the coke is clearly superior to the expected effect.

Figure 2:
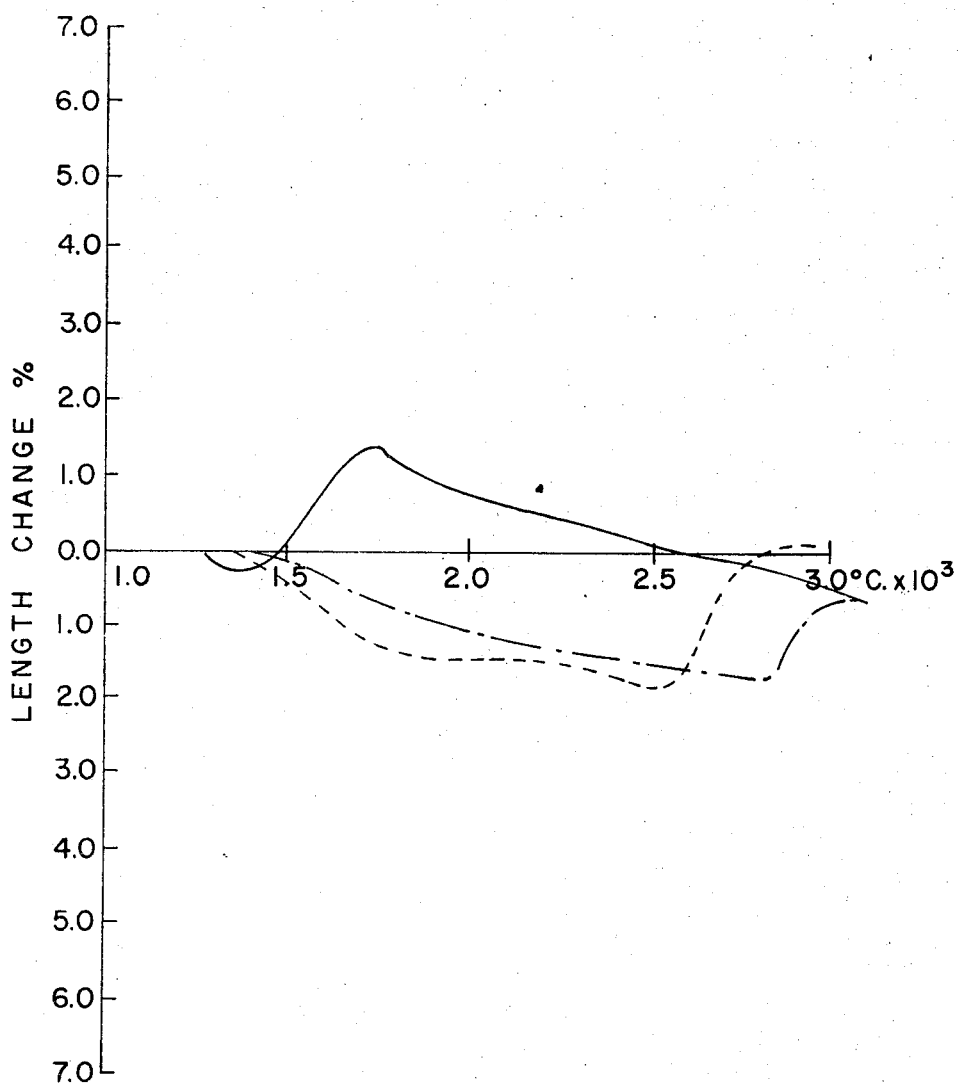

Such puffing can be completely eliminated by as little as 0.2 percent by weight of iron oxide or the like. FIG. 2 shows the effect of adding 2 percent iron as the oxide to the mix.

FIGS. 3 through 8 relate to various mixtures of American Oil Company's El Dorado coke, an early puffer obtained from the delayed coking of a high sulfur reduced crude petroleum fraction and Conoco premium coke (described hereinbefore).

Figure 3:
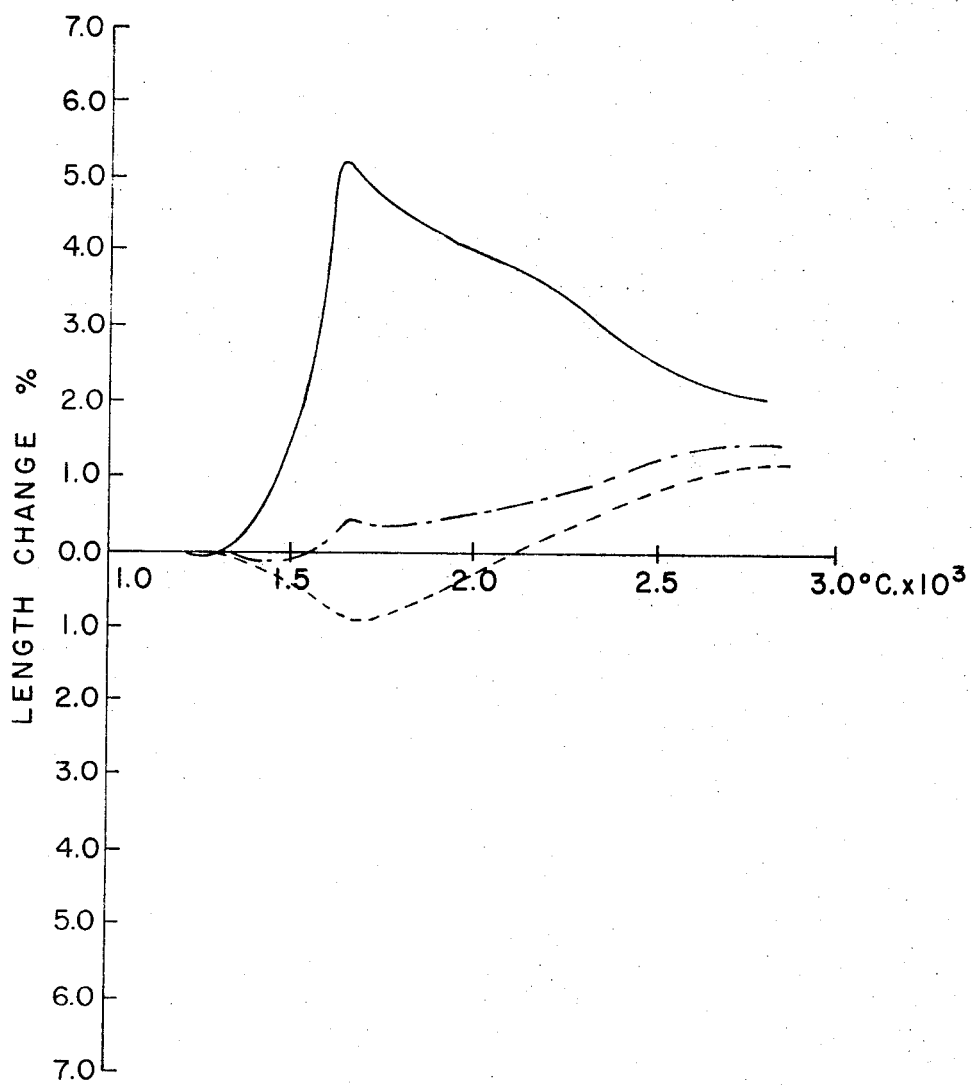

FIG. 3 shows the puffing characteristics of substituting one-third of the Conoco premium coke with the early puffing El Dorado Coke with no puffing inhibitor. The mixture shows some accommodation and an unexpected improvement in puffing characteristics at low temperatures.

Figure 4:
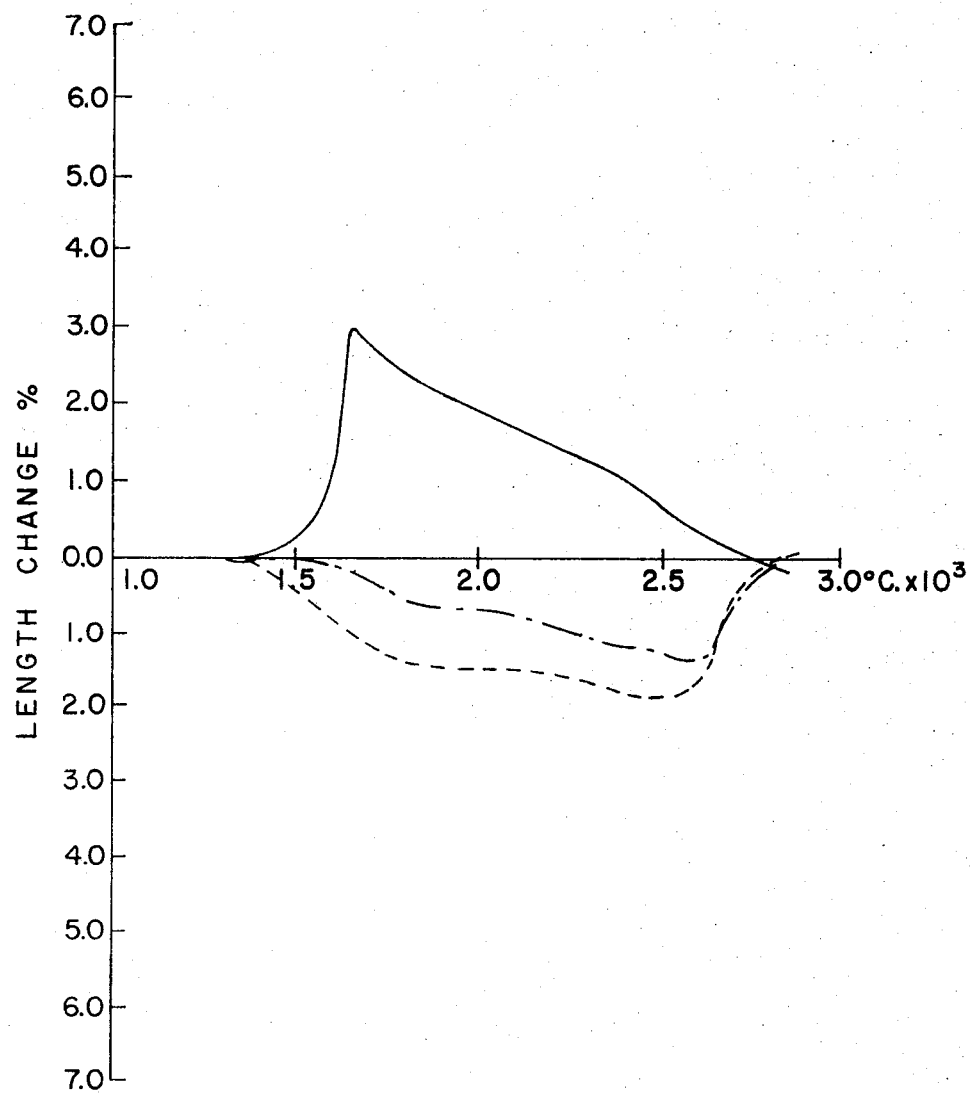

The effect of iron oxide puffing inhibitor is clearly evident in FIG. 4, showing the result of adding 2 percent iron. The mixture is nearly equivalent to the curve obtained for the normal puffing coke without the dilution by El Dorado coke.

Figure 5:
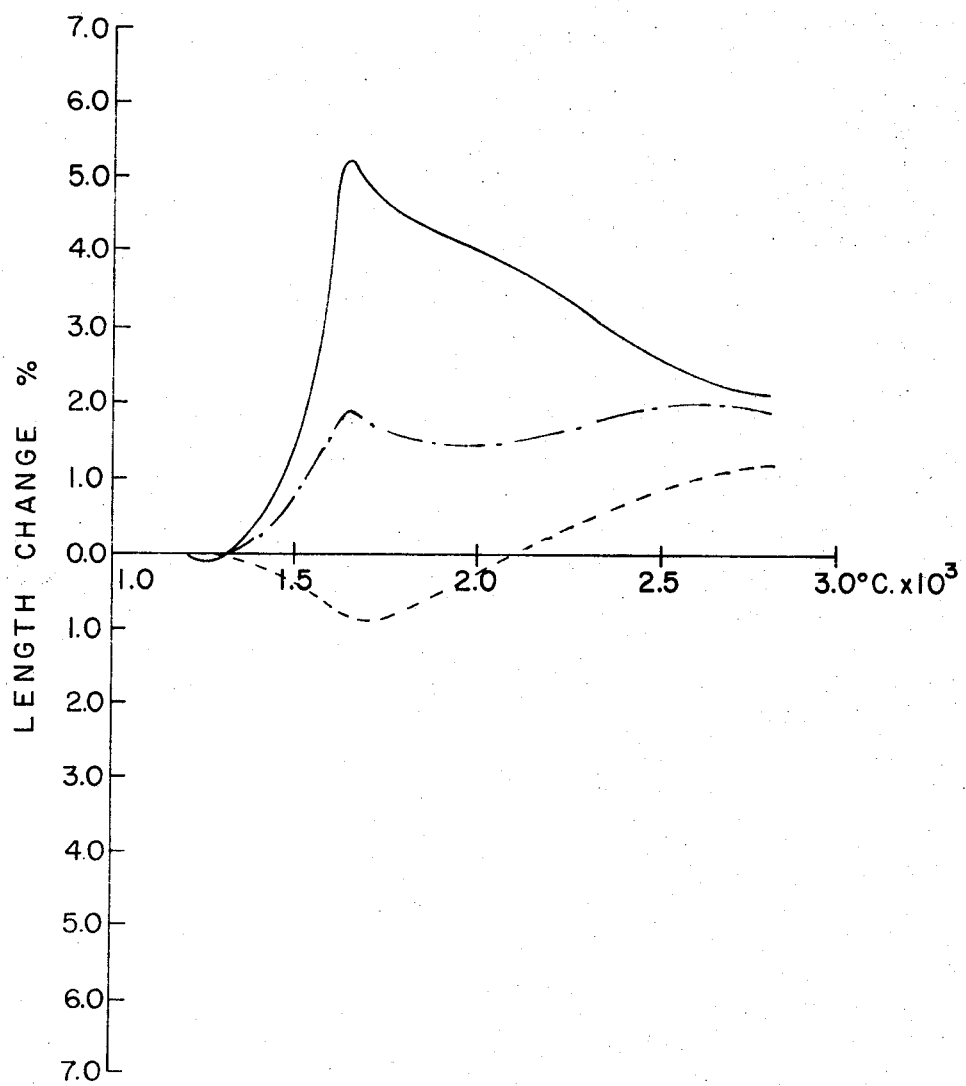
Figure 6:
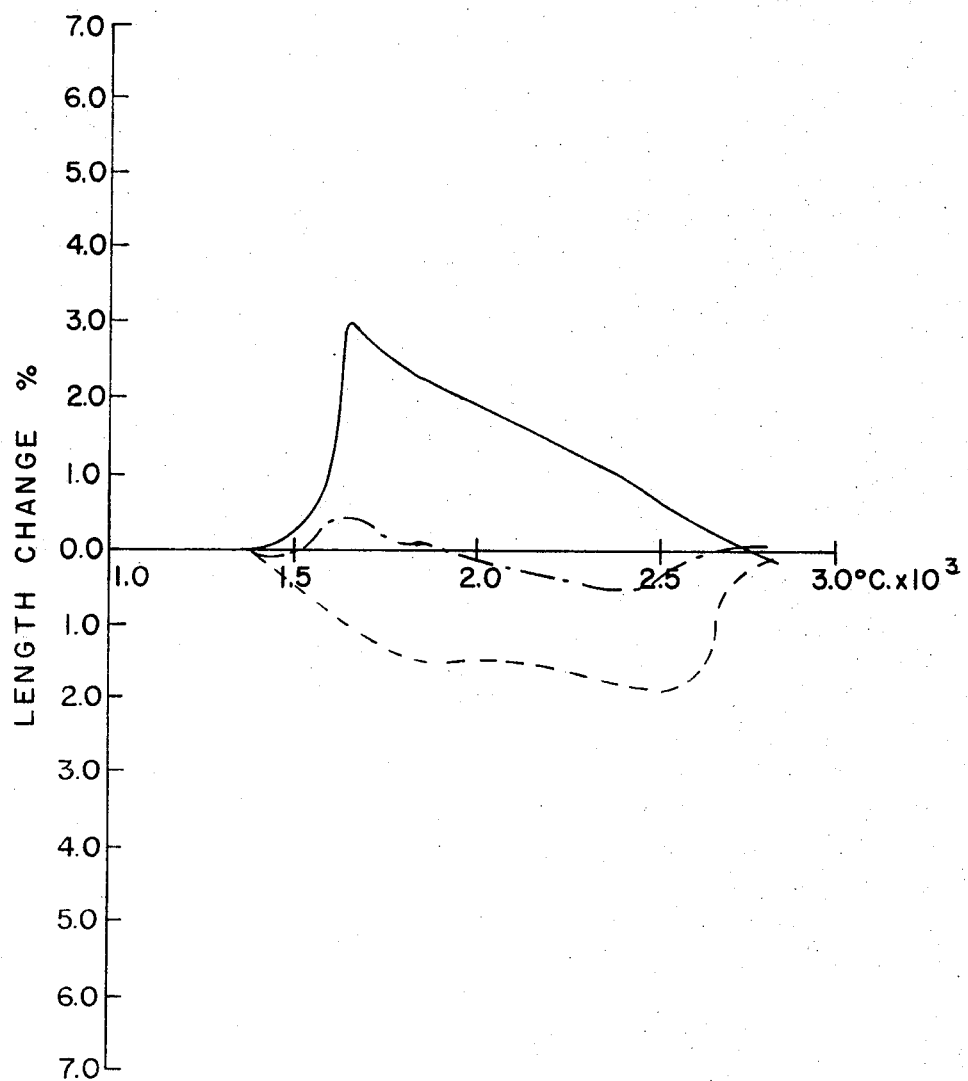

FIGS. 5 and 6 relate to a mixture of 50 percent El Dorado and 50 percent Conoco premium cokes. Again, some accommodation can be noted in the mixture containing no iron, FIG. 5, but a clearly superior result is obtained by the addition of 2 percent iron as iron oxide, FIG. 6.

Figure 7:
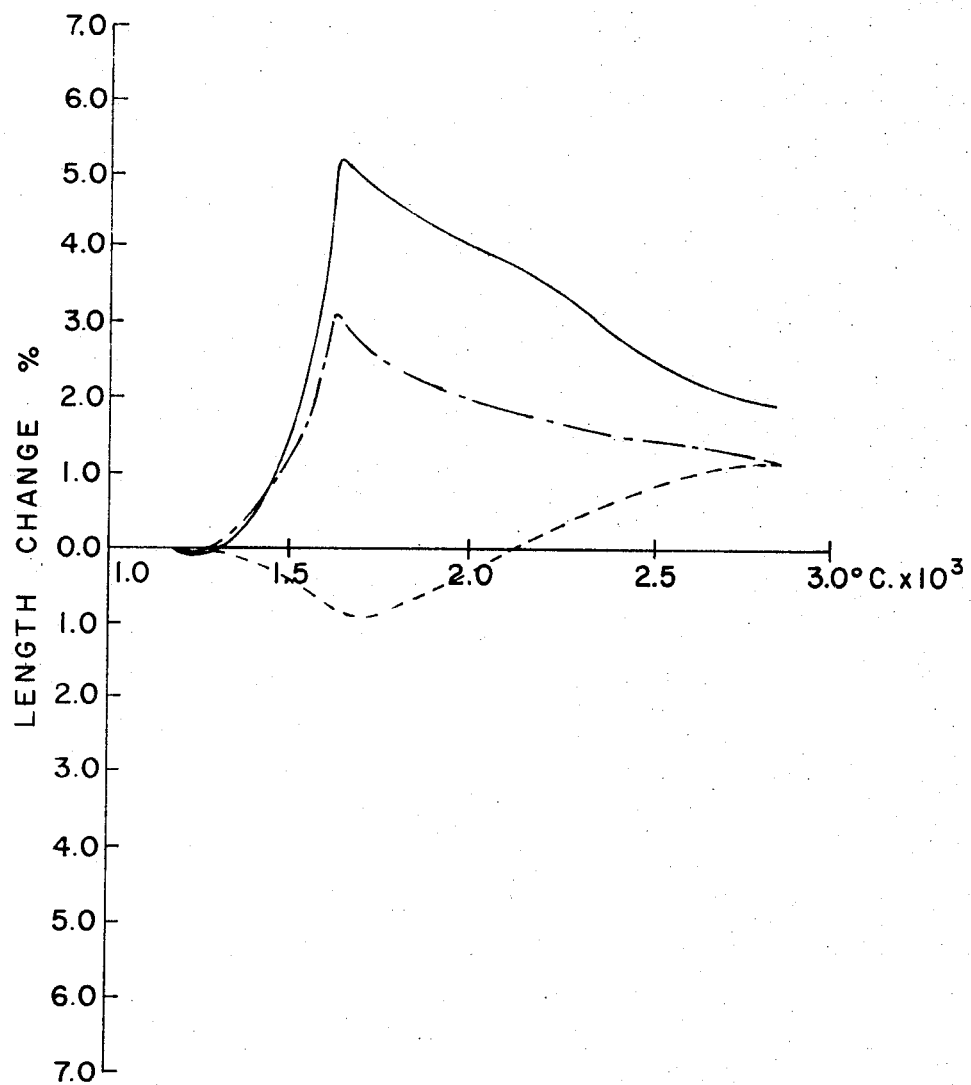
Figure 8:
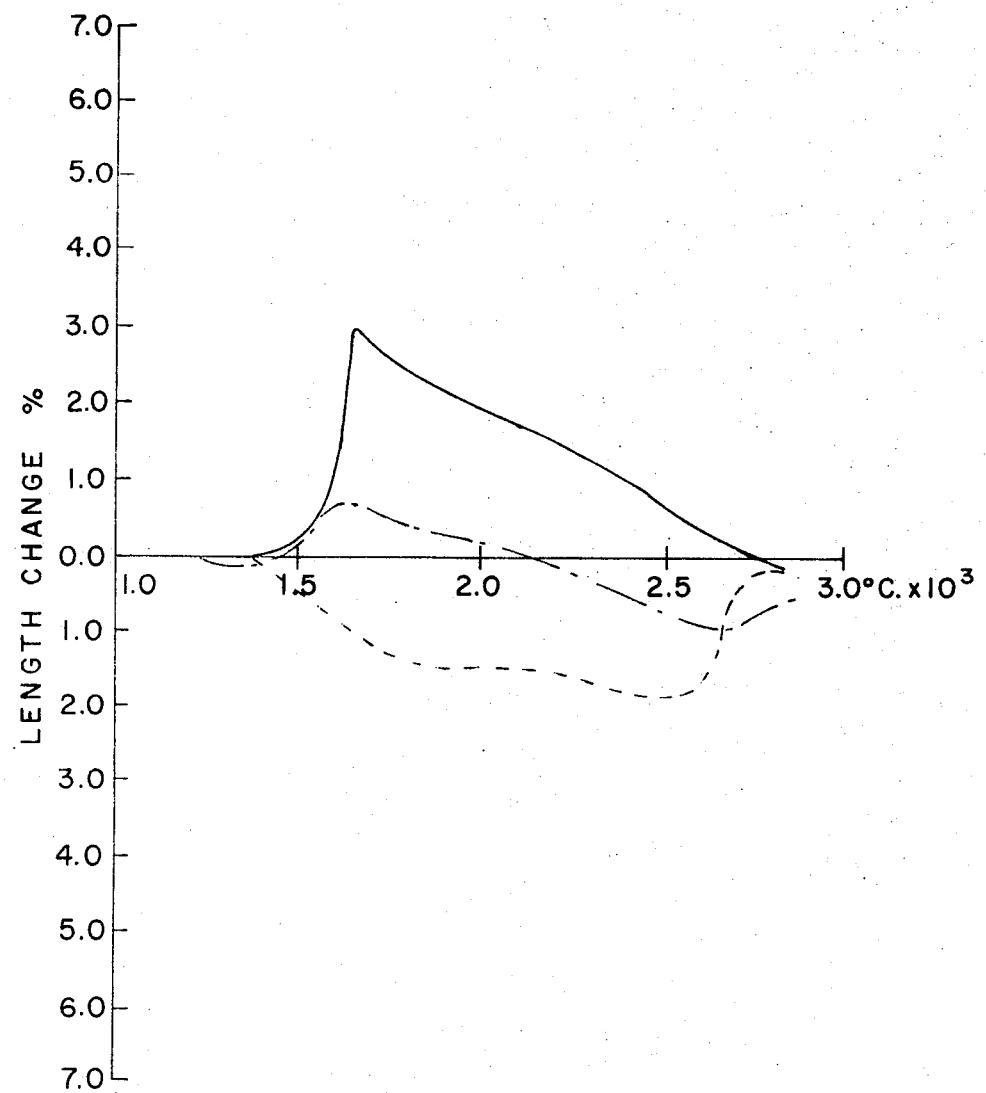

FIGS. 7 and 8 relate to a mixture of 2 parts of the early puffing coke to one part of the Conoco premium coke. Again, the curves demonstrate some accommodation without iron; however, the addition of iron yields a clearly superior result.

Figure 9:
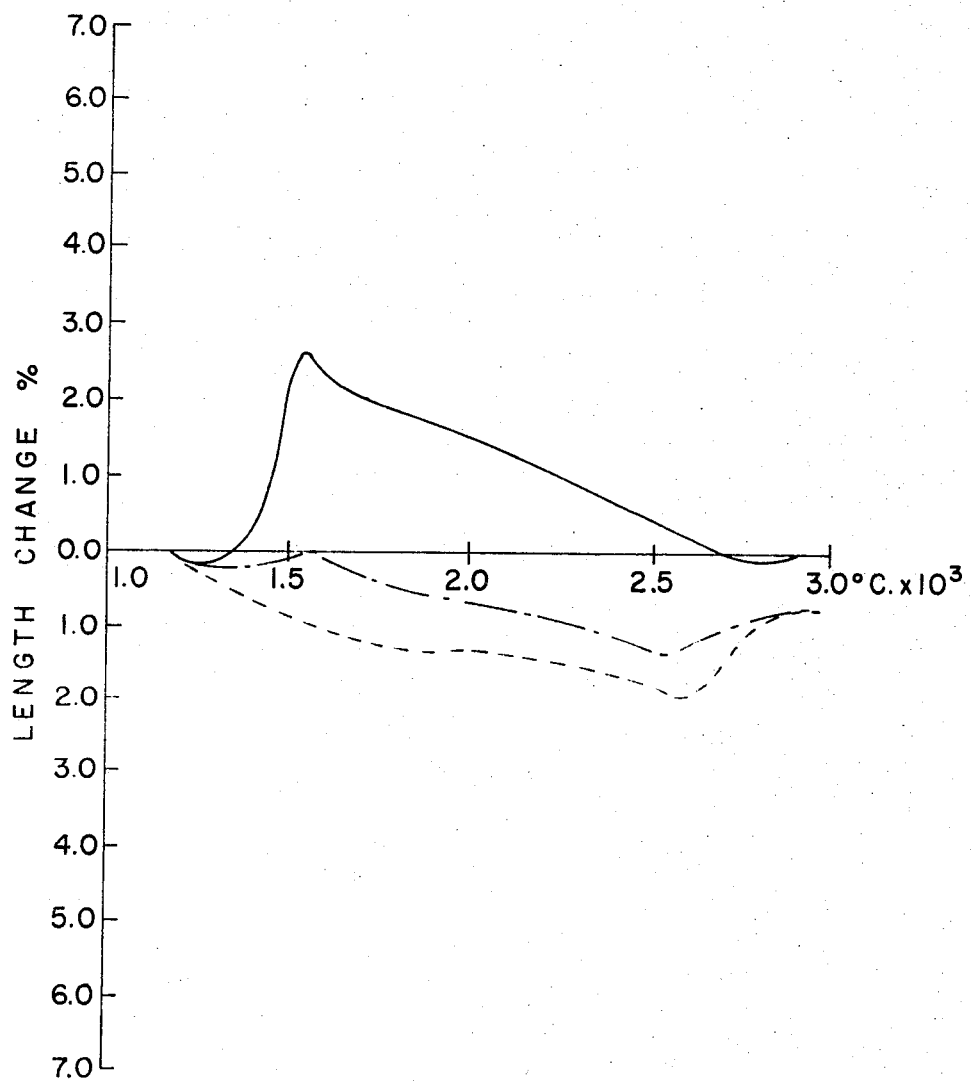
Figure 10:
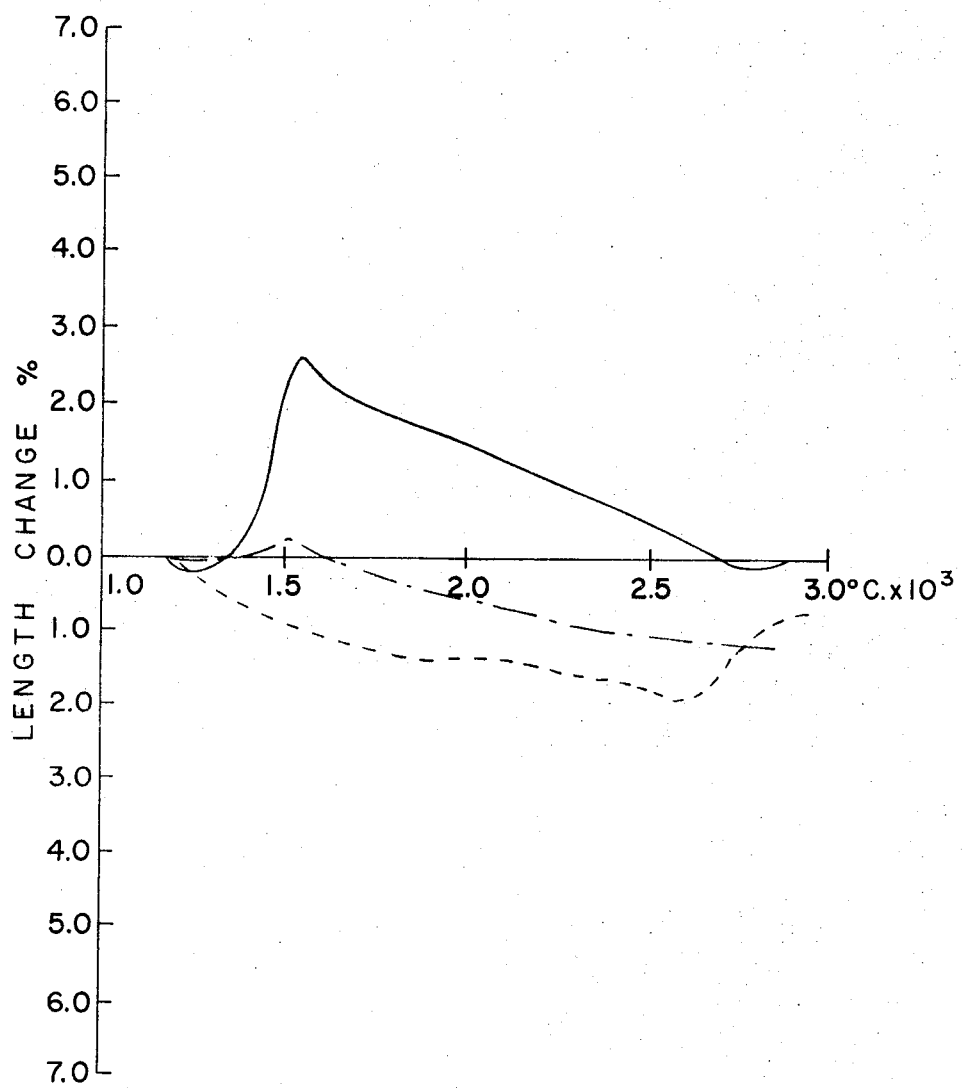
Figure 11:
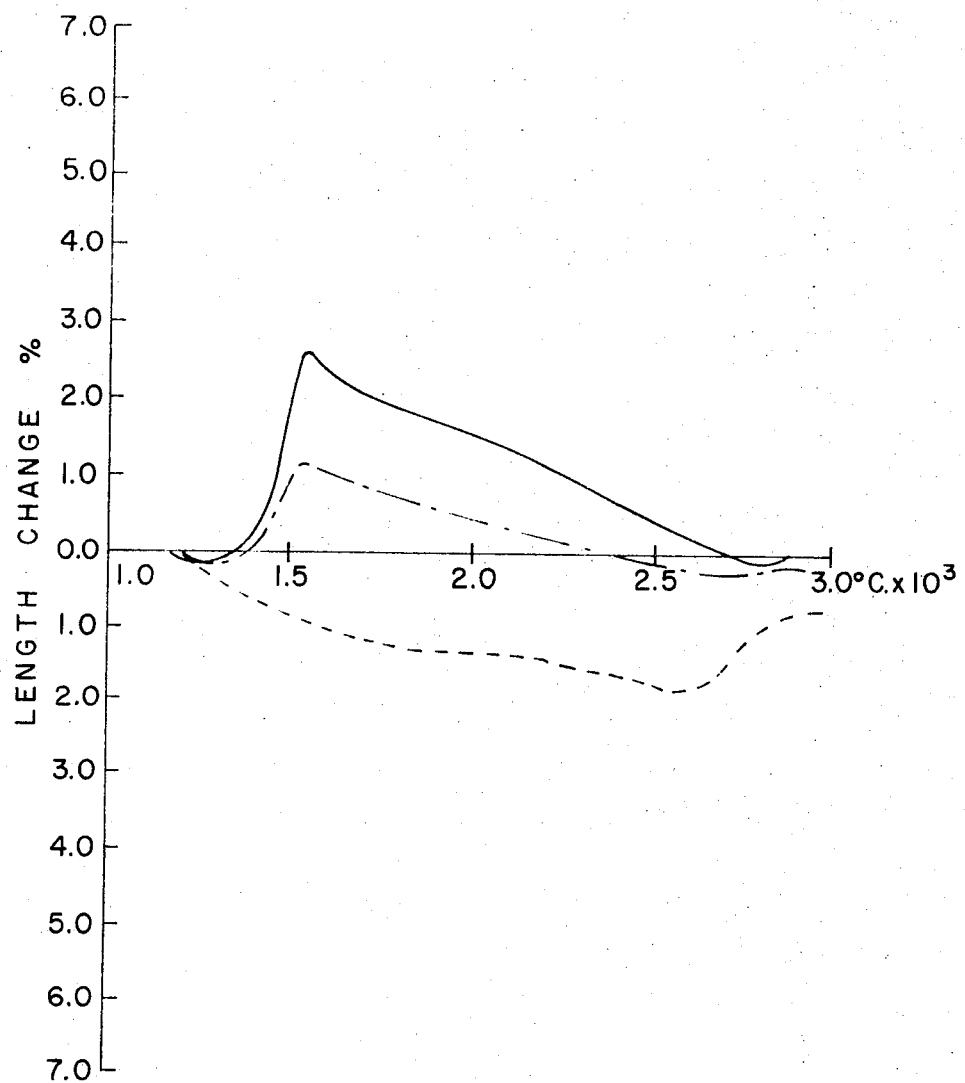

FIGS. 9–11 relate to various mixtures of American Oil Company's El Dorado coke and Marathon Oil Company's Coke "P8" coke exhibiting differing puffing characteristics. FIG. 9 pertains to a mixture of one part El Dorado coke to two parts Marathon coke containing 2 percent $Fe_2O_3$ as an inhibitor; FIG. 10 pertains to an equal weight mixture of the cokes containing 2 percent $Fe_2O_3$; and FIG. 11 pertains to a mixture of 2 parts El Dorado and one part Marathon coke containing 2 percent $Fe_2O_3$. In all cases, the mixtures are clearly superior to the puffing characteristics expected from the mere mixing of the ingredients. The following example will more clearly demonstrate the method of the present invention but is not intended to be limiting thereupon.

EXAMPLE 1

American Oil Company's El Dorado coke, 2 kg. and Continental Oil Company's premium coke, 2 kg. are separately calcined to 1250° C. The calcined cokes are crushed and 1.7 kg. samples of each coke, containing 20 parts through 3 on 6 mesh, 10 parts through 10 on 20 mesh, 10 parts through 20 on 35 mesh, and 60 parts coke flour (55 percent through 200 mesh) are combined and admixed with 1 kg. of coal tar pitch. The whole is heated with stirring at 150° C. for 20 minutes, cooled to about 100° C. and extruded into a 1.5 inch diameter rod. The rod is baked at about 850° C. then graphitized to 2800° C. in the usual manner to give a sound graphite rod. A similar rod prepared from El Dorado coke is unsatisfactory for electrode purposes.

We claim:

1. In a method for the manufacture of graphite bodies from an early puffing needle-type coke which comprises admixing the coke with a pitch binder, mechanically forming the body, and carbonizing and graphitizing the formed bodies, the improvement which consists of combining into a mixture in an amount of from about 5 to 67 percent of the early puffing needle-type coke with a regular puffing needle type coke and an effective amount of a puffing inhibitor to prevent puffing of said body during graphitization.
2. The method of Claim 1 wherein the above 0.2 to about 10 percent of the puffing inhibitor is used.
3. The method of Claim 1 wherein the puffing inhibitor is an oxygen containing compound of iron.
4. The method of Claim 1 wherein the puffing inhibitor is an oxygen containing compound of calcium.
5. The method of Claim 1 wherein the puffing inhibitor is an oxygen containing compound of aluminum.
6. The method of Claim 1 wherein the puffing inhibitor is an oxygen containing compound of manganese.
7. The method of Claim 1 wherein the puffing inhibitor is iron oxide.
8. The method of Claim 1 wherein the amount of early puffing coke is about 5 to about 50 percent.
9. The method of Claim 8 wherein the puffing inhibitor is iron oxide.
10. The method of Claim 9 wherein 2 percent of iron oxide is used as a puffing inhibitor.

References Cited

UNITED STATES PATENTS

| | | | |
|---|---|---|---|
| 2,775,549 | 12/1956 | Shea | 208—131 X |
| 2,814,076 | 11/1957 | Gartland | 264—29 |
| 3,506,745 | 4/1970 | Juel et al. | 264—29 |
| 3,526,684 | 9/1970 | Hutchings | 264—29 |
| 3,563,705 | 2/1971 | Grindstaff et al. | 423—448 |
| 3,624,231 | 11/1971 | Juel et al. | 423—448 X |
| 3,642,962 | 2/1972 | Wallouch | 264—29 |

EDWARD J. MEROS, Primary Examiner

U.S. Cl. X.R.

264—29